United States Patent
Gammel et al.

(10) Patent No.: US 7,269,742 B2
(45) Date of Patent: Sep. 11, 2007

(54) MICROPROCESSOR CONFIGURATION WITH ENCRYPTION

(75) Inventors: Berndt Gammel, Markt Schwaben (DE); Oliver Kniffler, München (DE); Holger Sedlak, Egmating (DE)

(73) Assignee: Infineon Technologies AG, Munich (DE)

( * ) Notice: Subject to any disclaimer, the term of this patent is extended or adjusted under 35 U.S.C. 154(b) by 810 days.

(21) Appl. No.: 10/197,789

(22) Filed: Jul. 18, 2002

(65) Prior Publication Data
US 2003/0005313 A1    Jan. 2, 2003

Related U.S. Application Data

(63) Continuation of application No. PCT/DE00/04448, filed on Dec. 14, 2000.

(30) Foreign Application Priority Data
Jan. 18, 2000    (EP) ................... 00100955

(51) Int. Cl.
 G06F 11/30    (2006.01)
 G06F 12/14    (2006.01)
 H04L 9/32    (2006.01)
(52) U.S. Cl. .................. 713/189; 713/168; 726/26; 380/268; 380/274; 380/262
(58) Field of Classification Search .......... 713/189
 See application file for complete search history.

(56) References Cited

U.S. PATENT DOCUMENTS

| | | | |
|---|---|---|---|
| 4,683,968 A | 8/1987 | Appelbaum et al. | |
| 4,864,615 A * | 9/1989 | Bennett et al. | 380/239 |
| 5,404,402 A * | 4/1995 | Sprunk | 713/189 |
| 5,477,039 A * | 12/1995 | Lisimaque et al. | 235/380 |
| 5,748,744 A * | 5/1998 | Levy et al. | 380/52 |
| 5,870,468 A | 2/1999 | Harrison | |
| 5,944,833 A * | 8/1999 | Ugon | 713/400 |
| 5,959,435 A * | 9/1999 | Ikegami | 320/132 |
| 6,195,752 B1 * | 2/2001 | Pfab | 713/168 |
| 6,209,098 B1 * | 3/2001 | Davis | 713/194 |
| 6,704,872 B1 * | 3/2004 | Okada | 713/194 |
| 6,895,506 B1 * | 5/2005 | Abu-Husein | 713/193 |
| 6,973,570 B1 * | 12/2005 | Hamlin | 713/168 |
| 6,983,366 B1 * | 1/2006 | Huynh et al. | 713/168 |

FOREIGN PATENT DOCUMENTS

| | | |
|---|---|---|
| EP | 0 720 098 A1 | 7/1996 |
| EP | 0 965 994 A1 | 12/1999 |
| GB | 2 203 271 A | 10/1988 |
| JP | 62-502080 | 8/1987 |
| JP | 9-293021 | 11/1997 |
| WO | 98/16883 | 4/1998 |
| WO | WO99/46774 | 9/1999 |

* cited by examiner

Primary Examiner—Emmanuel L. Moise
Assistant Examiner—Shewaye Gelagay
(74) Attorney, Agent, or Firm—Laurence A. Greenberg; Werner H. Stemer; Ralph E. Locher

(57) ABSTRACT

A microcontroller for security applications includes an encryption unit between a bus and a functional unit. The encryption unit includes a gate and a key register. A memory is provided with a further encryption unit whose gate is connected between the register and the gate of the first encryption unit. As a result, the transferred information item is available in encrypted form at any point on the bus.

33 Claims, 1 Drawing Sheet

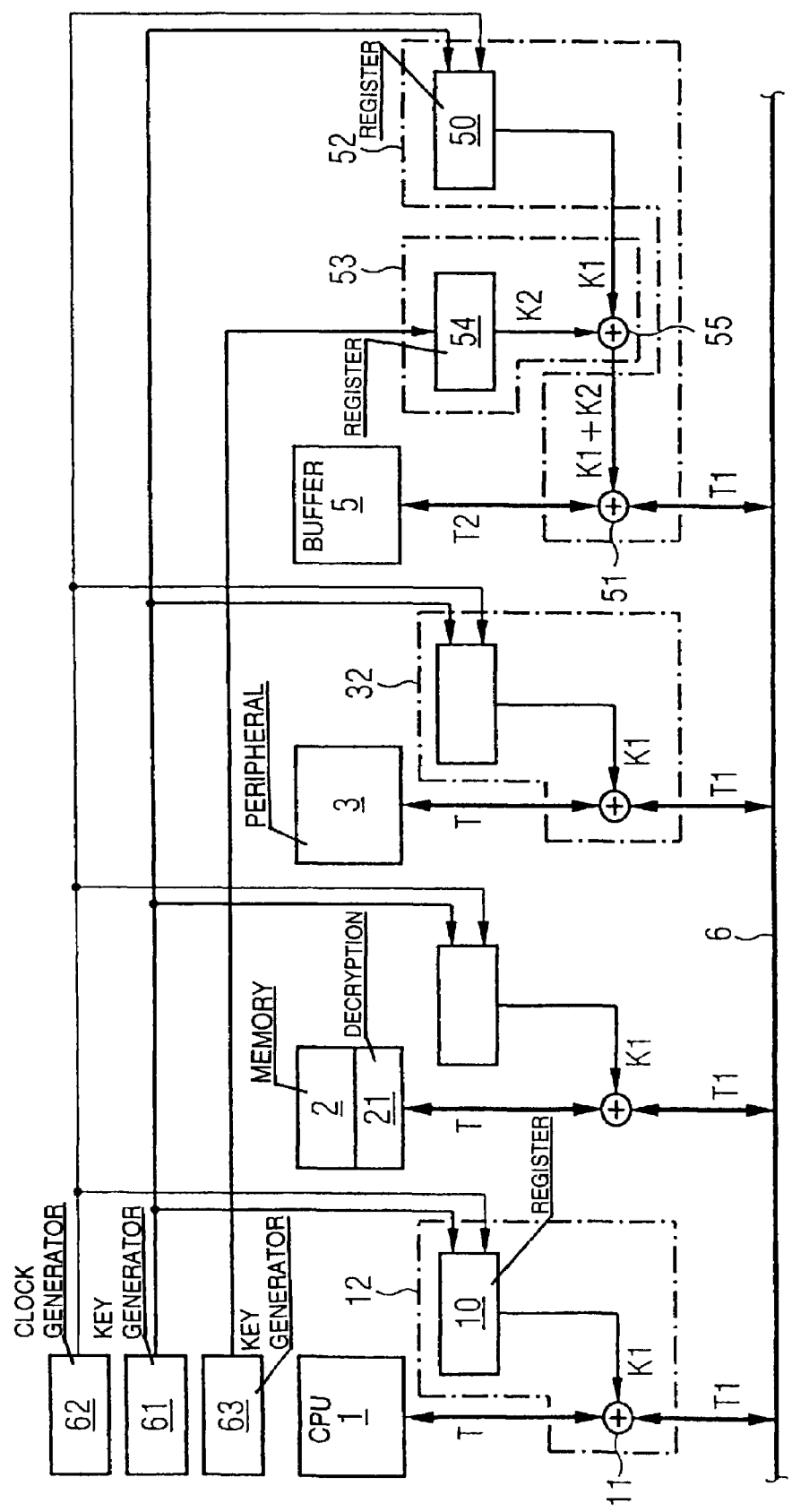

MICROPROCESSOR CONFIGURATION WITH ENCRYPTION

CROSS REFERENCE TO RELATED APPLICATION

This application is a continuation of copending International Application No. PCT/DE00/04448, filed Dec. 14, 2000, which designated the United States and was not published in English.

BACKGROUND OF THE INVENTION

1. Field of the Invention

The invention relates to a microprocessor configuration in which a central processing unit, a further unit, and a memory unit are connected to one another through a bus and encryption is performed.

Such microprocessor configurations are used in security-critical applications, for example, in a chip card. The configuration is integrated on a single semiconductor chip, a "microcontroller". The bus handles all the data traffic. By way of example, the bus transmits data, addresses, program commands, control commands, etc. The programs to be executed are stored in a non-volatile memory (ROM); data can likewise be stored in the non-volatile memory or temporarily in a volatile memory (RAM). Due to the long access time to these memories, the data to be processed are buffered in faster caches.

All the memories and the buses on the microprocessor or microcontroller are easily identifiable regular structures on the chip. They, therefore, represent preferred points of attack when attempts are being made to tap off chip-internal circuits or operating cycles for the purpose of covertly observing security-related data and functions. Any attacks can be made by probing, which involves tapping off the signal profiles by placing needles onto significant structures.

In conventional microprocessors or microcontrollers, data stored in the memory are, therefore, scrambled using complex encryption. Reading requires a corresponding level of computation complexity. The data are subsequently transferred and supplied to the various functional units of the microprocessor generally in unencrypted form. In the event of a needle attack on the bus, all data could, therefore, be requested as plain text. Comparatively complex encryption and decryption also of the data traffic from and to the central processing unit (CPU), a peripheral unit, or an arithmetic and logic unit (ALU) or of the cache are not recommended because this would significantly reduce the access speed to these units.

SUMMARY OF THE INVENTION

It is accordingly an object of the invention to provide a microprocessor configuration with encryption that overcomes the hereinafore-mentioned disadvantages of the heretofore-known devices of this general type and that has a higher level of security against covert observation of internal cycles.

With the foregoing and other objects in view, there is provided, in accordance with the invention, a microprocessor configuration, including a central processing unit, a functional unit, a memory unit, each of the central processing unit, the memory unit, and the functional unit having a first encryption unit with a first means for providing an alterable key and a first combinational logic element, the memory unit having a second encryption unit with a second means for providing a key and a second combinational logic element, a bus, the first encryption unit connecting the central processing unit to the bus, the second encryption unit connecting the functional unit to the bus, the third encryption unit connecting the memory unit to the bus, the bus connecting the central processing unit, the functional unit, and the memory unit to one another for interchanging data therebetween, and the second combinational logic element connected between the first alterable key providing means and the first combinational logic element. The first means for providing an alterable key can be an alterable key providing device, and the second means for providing a key can be a key providing device.

The combinational logic element is connected between the bus and the associated unit and the key is the same for the units and is alterable.

In the microprocessor configuration according to the invention, each functional unit connected to the bus is provided with an encryption device that is of relatively simple construction. The device includes a means for providing a key, for example, a register, and also a combinational logic element, for example, an Exclusive-OR-gate. The encryption device is capable of both encrypting the data item that is output onto the bus by the functional unit and decrypting a data item that is to be received. The encryption device has a simple configuration and, therefore, results in no significant delay during data transfer.

Expediently, the key stored in the register is altered from time to time. The key is updated preferably with every operating clock cycle. So that a data value, which is output onto the bus by a functional unit and is encrypted, can be decrypted again by another functional unit when the key changes, the key registers for each functional unit need to contain the same key for affiliated read and write operations.

To such an end, the key is expediently generated by a key generator that forwards the same key to all the key registers in sync with the clock. Preferably, the key is generated under random control. Despite the simple encryption and decryption that barely takes up any delay time, the random provision of various keywords provides adequate security against tapping-off and covert observation of the data traffic.

In accordance with another feature of the invention, the key generator is a random number generator adapted to randomly generate binary numbers.

To prevent a memory connected to the bus, for example, a cache, a buffer, or a translation lookaside buffer, from storing the information as plain text, additional encryption and decryption are required. To such an end, a further encryption unit is provided that again includes a means for providing the key, for example, a further key register, and also a combinational logic element, for example, an Exclusive-OR-gate. A fundamental aspect is that the combinational logic element for the further encryption unit is disposed between the combinational logic element for the first encryption unit and the latter's key register. Such a configuration has the advantage that all the bus sections, particularly, those between the combinational logic element for the first encryption unit, which is disposed between the bus and the memory, and the memory, carry only encrypted data.

In accordance with a further feature of the invention, there is provided a clock generator, the register of each of the first encryption units being commonly controlled by the clock generator.

In accordance with an added feature of the invention, the register of each of the first encryption units is adapted to be controlled by a common clock generator.

In accordance with an additional feature of the invention, the first combinational logic element has an input, the second combinational logic element has inputs, the second key providing means has a register with an input and an output, a second key generator is connected to the input of the register of the second key providing means, a respective one of the inputs of the second combinational logic element is connected to the output of the register of the second key providing means and the register of the first alterable key providing means, and the output of the second combinational logic element is connected to the input of the first combinational logic element.

In accordance with yet another feature of the invention, a respective one of the inputs of the second combinational logic element is connected to the output of the register of the second key providing means and the register of the first alterable key providing means of the memory unit, and the output of the second combinational logic element is connected to an input of the first combinational logic element of the memory unit.

The key register for the second encryption unit is fed by a further key generator. Expediently, this key is also altered from time to time. In such a case, it is necessary to ensure that data buffered in the memory in encrypted form are read again using the same key. The key for the key register is, therefore, updated only when the memory no longer contains any valid information. This is the case, for example, when the memory is completely empty or when the memory is reinitialized. This is done, for example, when the microprocessor configuration has terminated an application and starts a new application. In the event of such an application change, it is no longer necessary to change the memory content for security reasons because the change of key means that a new application can no longer use the data content still held in the memory anyway.

In accordance with yet a further feature of the invention, the second combinational logic element is an Exclusive-OR-gate.

In accordance with yet an additional feature of the invention, the encryption units include only Exclusive-OR-gates and associated key registers for each functional unit connected to the bus. The circuit complexity is relatively low. The key generators each need to be provided only in simple form. The additional computation complexity is relatively-low by comparison with the security obtained against covert observation of the data traffic.

In accordance with yet an added feature of the invention, the memory unit is a volatile memory.

In accordance with again another feature of the invention, there is provided a second memory unit connected to the bus, the memory unit being a cache buffering data for the second memory unit.

In accordance with again a further feature of the invention, the functional unit is a second memory unit and the memory unit is a cache buffering data for the second memory unit.

In accordance with a concomitant feature of the invention, the second key providing means is a second alterable key providing means.

Other features that are considered as characteristic for the invention are set forth in the appended claims.

Although the invention is illustrated and described herein as embodied in a microprocessor configuration with encryption, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

The Figure is a block and schematic circuit diagram of the microcontroller according to the invention.

DESCRIPTION OF THE PREFERRED EMBODIMENTS

Referring now to the single figure of the drawing, there is illustrated a block diagram of a microcontroller for security applications in accordance with the invention. The microcontroller includes a number of components: a central processing unit (CPU) 1, which handles control of the data traffic; a memory 2, which permanently stores data and programs that are to be executed; a peripheral unit 3, which implements data traffic to external circuits disposed outside the microcontroller; and a buffer 5, which buffers data. Connections shown in bold include a plurality of lines.

The non-volatile memory 2 includes a decryption device 21 that performs very good encryption with a relatively long key length. However, decryption requires a relatively long computation time and is of corresponding complexity in terms of circuitry. Data to be read from the memory 2 are, therefore, temporarily buffered in the buffer 5, which can be accessed much faster. The buffer 5 is a "cache". The functional units mentioned are connected to one another by a bus 6 that includes a multiplicity of data and control lines.

Disposed between the bus 6 and each of the functional units is an encryption unit, for example, the units 12, 32, and 52. The encryption unit encrypts the data traffic that is output onto the bus 6 by the functional unit, and decrypts the data traffic received.

The encryption units for the functional units 1, 2, and 3 have an identical configuration. By way of example, the encryption unit 12 associated with the CPU 1 includes a key register 10 storing a keyword. An Exclusive-OR-gate 11 is connected in the data path between CPU 1 and bus 6. In addition, the gate 11 is also supplied with the key K1 from the key register 10. By logically combining the data value received from the bus 6 with the keyword K1, the data item T1 received from the bus 6 in encrypted form is converted into plain text T. The line from the Exclusive-OR-gate to the CPU 1 cannot generally be readily tapped because the CPU 1 has an irregular structure. When the CPU 1 outputs a data value T onto the bus 6, the plain text data value is logically combined in the Exclusive-OR-gate 11 with a key provided by the key register 10 and is provided on the bus as a data item T1. Another unit, for example, a peripheral unit 3, receives the encrypted data item T1 and decrypts it in complementary fashion.

The key K1 used for encryption in the unit 12 is altered cyclically. The key is provided by a key generator 61 that generates the keyword randomly. With every clock cycle provided by a clock generator 62, the keyword K1 changes. It is fundamental that a key K1 used for encrypting a data value that is output upstream of the CPU 1 is likewise available on the other encryption units for decrypting the same data value. To this end, all the key registers associated with the respective functional units are connected to the random number generator 61 and to the clock generator 62 in parallel. As a result, by way of example, a data value T delivered by the CPU 1 is output onto the bus as data value T1 in encrypted form and is decrypted using the same key K1 on the peripheral unit 3, where it is provided as the same data item T in plain text. The randomly controlled updating of the key achieves a high level of security against a decryption attempt on the data item transferred through the bus.

Connected upstream of the cache 5 is an encryption unit 52 corresponding to the encryption unit 12 and 32. The encryption unit 52 includes a key register 50 that is connected to the clock generator 62 and to the random number generator 61 in the same way, and also an Exclusive-OR-gate 51, which is connected in the data path between the bus 6 and the cache 5. With no other measures, the data traffic running between the gate 51 and the cache 5 would be available as plain text; in addition, the data would be stored in the cache 5 as plain text.

To provide additional encryption for the data stored in the cache 5, a further encryption unit 53 is provided that is combined with the encryption unit 52 to re-encrypt the data decrypted by the encryption unit 52 using the key K1. The further encryption unit 53 includes a key register 54 and also an Exclusive-OR-gate 55. The Exclusive-OR-gate 55 is connected between the key register 50 and the Exclusive-OR-gate 51. The Exclusive-OR-gate 55 logically combines the keys from the registers 50 and 54 with one another. The effect of this is that the data stream T2 delivered to the cache 5 by the Exclusive-OR-gate 51 is in encrypted form.

Correspondingly, the data T2 read from the cache 5 are decrypted again using the keyword K2 stored in the key register 54 and are encrypted for output onto the data bus 6 using the current alterable key K1 stored in the key register 50.

While the cache 5 stores valid data that need to be read to the bus again for further processing, the keyword K2 provided by the key register 54 must continue to remain the same. The keyword K2 is generated by a further key generator 63. Expediently, the key K2 is changed when the cache 5 no longer contains any valid data. The key is again updated based upon a random pattern so that sufficient security is ensured against unscrambling of the data that are stored in the memory and are transferred through the bus section between the gate 51 and the memory 5.

It is recommended that the key K2 be changed when the cache 5 is emptied based upon a cache flush. Such an operation is performed, by way of example, when the application processed by the microprocessor configuration changes. With a cache flush, all the data values in the cache are reset to a prescribed value. In principle, it is also possible to dispense with resetting the memory content because the memory content can no longer be decrypted anyway when there is a change of key.

The effect achieved by the invention is that all the data traffic running through the bus 6 and, in addition, the data buffered in the buffer are always in encrypted form and are not available as plain text. The use of Exclusive-OR-gates allows symmetrical encryption and decryption methods to be used, which require little circuit and computation complexity. The length of key is oriented toward the number of lines in the bus. It is possible for all the lines or only some of the lines to be encrypted. The key register is then correspondingly smaller. For every line, one bit of a keyword is used. With bus lines, both the data lines and the status and control lines of the bus can be encrypted. In principle, it is also possible to encrypt single security-related signal lines in microprocessor configurations or other circuits with appropriate use of the measures described above. As a random source for the key generators 61 and 63, a physical source is particularly suitable. If the security requirement is less, a pseudo random number generator can generate the key. The key generators can be in the form of linear feedback shift registers (LFSR). The key can be updated by the clock generator 62 with every clock cycle for the bus 6 or not until a particular number of clock cycles have elapsed. Suitable choice of the parameters sets a desired degree of security.

We claim:

1. A microprocessor configuration, comprising:
    a central processing unit;
    a functional unit;
    a memory unit;
    said central processing unit, said memory unit, and said functional unit each having a first encryption unit with:
        a first means for providing an alterable key being the same in said first encryption unit for each of said central processing unit, said memory unit and said functional unit; and
        a first combinational logic element;
    said memory unit having a second encryption unit with:
        a second means for providing a key; and
        a second combinational logic element;
    a bus receiving alterable key encrypted data from said central processing unit, said memory unit, and said functional unit;
    said first encryption unit of said central processing unit directly connecting said central processing unit to said bus
    said first encryption unit of said functional unit directly connecting said functional unit to said bus;
    said first encryption unit of said memory unit directly connecting said memory unit to said bus;
    said bus connecting said central processing unit, said functional unit, and said memory unit to one another for interchanging the alterable key encrypted data therebetween, the alterable key encrypted data transmitted by said bus and sent to said memory unit being decrypted using the alterable key and encrypted using the key, resulting in key encrypted data, and the key encrypted data transmitted from said memory unit and sent to said bus being decrypted using the key and encrypted using the alterable key resulting in the alterable key encrypted data; and
    said second combinational logic element connected between said second means and said first combinational logic element of said first encryption unit of said memory unit.

2. The microprocessor configuration according to claim 1, wherein:
    said first alterable key providing means has:
        a register with an output connected to said first combinational logic element; and
        an input side; and
    a key generator is connected to said input side of said first alterable key providing means of each of said first encryption units.

3. The microprocessor configuration according to claim 2, wherein said key generator is a random number generator adapted to randomly generate binary numbers.

4. The microprocessor configuration according to claim 3, including a clock generator, said register of each of said first encryption units being commonly controlled by said clock generator.

5. The microprocessor configuration according to claim 3, wherein said register of each of said first encryption units is adapted to be controlled by a common clock generator.

6. The microprocessor configuration according to claim 2, wherein:
said first combinational logic element has an input;
said second combinational logic element has inputs;
said second key providing means has a register with an input and an output;
a second key generator is connected to said input of said register of said second key providing means;
a respective one of said inputs of said second combinational logic element is connected to:
said output of said register of said second key providing means; and
said register of said first alterable key providing means; and
said output of said second combinational logic element is connected to said input of said first combinational logic element.

7. The microprocessor configuration according to claim 6, wherein:
a respective one of said inputs of said second combinational logic element is connected to:
said output of said register of said second key providing means; and
said register of said first alterable key providing means of said memory unit; and
said output of said second combinational logic element is connected to an input of said first combinational logic element of said memory unit.

8. The microprocessor configuration according to claim 6, wherein said second key generator is adapted to generate a new key when said memory unit has no valid memory content.

9. The microprocessor configuration according to claim 8, where said second key generator is adapted to generate a key after said memory unit has been initialized.

10. The microprocessor configuration according to claim 1, wherein said first combinational logic element is an Exclusive-OR-gate.

11. The microprocessor configuration according to claim 10, wherein said second combinational logic element is an Exclusive-OR-gate.

12. The microprocessor configuration according to claim 1, wherein said second combinational logic element is an Exclusive-OR-gate.

13. The microprocessor configuration according to claim 1, wherein said memory unit is a volatile memory.

14. The microprocessor configuration according to claim 1, including a second memory unit connected to said bus, said memory unit being a cache buffering data for said second memory unit.

15. The microprocessor configuration according to claim 1, wherein.
said functional unit is a second memory unit; and
said memory unit is a cache buffering data for said second memory unit.

16. The microprocessor configuration according to claim 1, wherein said second key providing means is a second alterable key providing means.

17. A microprocessor configuration, comprising:
a central processing unit;
a functional unit;
a memory unit;
said central processing unit, said memory unit, and said functional unit each having a first encryption unit with:
an alterable key providing device, said alterable key being the same in said first encryption unit for each of said central processing unit, said memory unit and said functional unit; and
a first combinational logic element;
said memory unit having a second encryption unit with:
a key providing device; and
a second combinational logic element;
a bus receiving alterable key encrypted data from said central processing unit, said memory unit, and said functional unit;
said first encryption unit of said central processing unit directly connecting said central processing unit to said bus;
said first encryption unit of said functional unit directly connecting said functional unit to said bus;
said first encryption unit of said memory unit directly connecting said memory unit to said bus;
said bus connecting said central processing unit, said functional unit, and said memory unit to one another for interchanging the alterable key encrypted data therebetween, the alterable key encrypted data transmitted by said bus and sent to said memory unit being simultaneously decrypted using said alterable key providing device and encrypted using said key providing device resulting in key encrypted data, and the key encrypted data transmitted from said memory unit and sent to said bus being simultaneously decrypted using said key providing device and encrypted using said alterable key providing device resulting in the alterable key encrypted data; and
said second combinational logic element connected between said alterable key providing device and said first combinational logic element of said first encryption unit of said memory unit.

18. The microprocessor configuration according to claim 17, wherein.
said alterable key providing device has:
a register with an output connected to said first combinational logic element; and
an input side; and
a key generator is connected to said input side of said alterable key providing device of each of said first encryption units.

19. The microprocessor configuration according to claim 18, wherein said key generator is a random number generator adapted to randomly generate binary numbers.

20. The microprocessor configuration according to claim 19, including a clock generator, said register of each of said first encryption units being commonly controlled by said clock generator.

21. The microprocessor configuration according to claim 19, wherein said register of each of said first encryption units is adapted to be controlled by a common clock generator.

22. The microprocessor configuration according to claim 18, wherein:
said first combinational logic element has an input;
said second combinational logic element has inputs;
said key providing device has a register with an input and an output;

a second key generator is connected to said input of said register of said key providing device;
a respective one of said inputs of said second combinational logic element is connected to:
said output of said register of said key providing device; and
said register of said alterable key providing device; and
said output of said second combinational logic element is connected to said input of said first combinational logic element.

23. The microprocessor configuration according to claim 22, wherein:
a respective one of said inputs of said second combinational logic element is connected to:
said output of said register of said key providing device; and
said register of said alterable key providing device of said memory unit; and
said output of said second combinational logic element is connected to an input of said first combinational logic element of said memory unit.

24. The microprocessor configuration according to claim 22, wherein said second key generator is adapted to generate a new key when said memory unit has no valid memory content.

25. The microprocessor configuration according to claim 22, where said second key generator is adapted to generate a key after said memory unit has been initialized.

26. The microprocessor configuration according to claim 17, wherein said first combinational logic element is an Exclusive-OR-gate.

27. The microprocessor configuration according to claim 26, wherein said second combinational logic element is an Exclusive-OR-gate.

28. The microprocessor configuration according to claim 17, wherein said second combinational logic element is an Exclusive-OR-gate.

29. The microprocessor configuration according to claim 17, wherein said memory unit is a volatile memory.

30. The microprocessor configuration according to claim 17, including a second memory unit connected to said bus, said memory unit being a cache buffering data for said second memory unit.

31. The microprocessor configuration according to claim 17, wherein:
said functional unit is a second memory unit; and
said memory unit is a cache buffering data for said second memory unit.

32. The microprocessor configuration according to claim 17, wherein said key providing device is a second key providing device.

33. A microprocessor configuration, comprising:
a central processing unit;
a functional unit;
a memory unit;
said central processing unit, said memory unit, and said functional unit each having a first encryption unit with:
a first means for providing an alterable key being the same in said first encryption unit for each of said central processing unit, said memory unit and said functional unit; and
a first combinational logic element having an input;
said memory unit having a second encryption unit with:
a second means for providing a key and having an output; and
a second combinational logic element having a first input, a second input and an output;
a bus receiving alterable key encrypted data from said central processing unit, said memory unit, and said functional unit;
said first encryption unit of said central processing unit directly connecting said central processing unit to said bus;
said first encryption unit of said functional unit directly connecting said functional unit to said bus;
said first encryption unit of said memory unit directly connecting said memory unit to said bus;
said bus connecting said central processing unit, said functional unit, and said memory unit to one another for interchanging the alterable key encrypted data therebetween, the alterable key encrypted data transmitted by said bus and sent to said memory unit being decrypted using the alterable key and encrypted using the key, resulting in key encrypted data, and the key encrypted data transmitted from said memory unit and sent to said bus being decrypted using the key and encrypted using the alterable key resulting in the alterable key encrypted data; and
said second combinational logic element connected between said second means and said first combinational logic element of said first encryption unit of said memory unit, said output of said second combinational logic element is connected to said input of said first combinational logic element;
said output of said first means of said memory unit connected to said first input of said second combination logic element; and
said output of said second means of said memory unit connected to said second input of said second combination logic element.

* * * * *